United States Patent
Pauwels

(10) Patent No.: US 7,515,586 B2
(45) Date of Patent: Apr. 7, 2009

(54) NETWORK ELEMENT COMPRISING A SWITCH FABRIC

(75) Inventor: Bart Joseph Gerard Pauwels, Tessenderlo (BE)

(73) Assignee: ALCATEL, Paris (FR)

( * ) Notice: Subject to any disclaimer, the term of this patent is extended or adjusted under 35 U.S.C. 154(b) by 612 days.

(21) Appl. No.: 11/156,528

(22) Filed: Jun. 21, 2005

(65) Prior Publication Data

US 2005/0286525 A1 Dec. 29, 2005

(30) Foreign Application Priority Data

Jun. 23, 2004 (EP) ................................ 04291580

(51) Int. Cl.
*H04L 12/28* (2006.01)
*H04L 12/56* (2006.01)

(52) U.S. Cl. ...................................... 370/390; 370/414

(58) Field of Classification Search ......... 370/412–414, 370/390
See application file for complete search history.

(56) References Cited

U.S. PATENT DOCUMENTS 5,436,893 A  7/1995  Barnett
6,011,779 A  1/2000  Wills
6,094,435 A  7/2000  Hoffman et al.
6,201,792 B1  3/2001  Lahat
6,636,510 B1  10/2003  Lee et al.
7,355,970 B2 *  4/2008  Lor ............................. 370/231
7,362,744 B2 *  4/2008  Basso et al. ................. 370/351
2003/0189942 A1 *  10/2003  Sawey ........................ 370/412

FOREIGN PATENT DOCUMENTS

EP         1 052 816 A     11/2000

* cited by examiner

*Primary Examiner*—Ronald Abelson
(74) *Attorney, Agent, or Firm*—Sughrue Mion, PLLC

(57) ABSTRACT

Switch fabrics (10) comprise first stages (11) for receiving multicast input signals (A-C) and second stages (12) for in response to the input signals generating output signals. The switch fabrics (10) are coupled to detectors (31) for detecting parameters indicating conditions of the second stages (12) per output signal and for generating detection results per output signal, and are coupled to controllers (21) for, in response to the detection results, controlling the second stages (12) per output signal. Such switch fabrics (10) handle output congestion in a more individual way. In case of one part of the second stage (12) being congested, the copying of the multicast input signals (A-C) into output signals and their internal transmission no longer need to be ceased. Only one of the output signals corresponding with the congested part of the second stage (12) cannot be delivered. Further detectors (32) detect further input signals (A-C) comprising segments of the same protocol data unit as the input signals (A-C).

16 Claims, 2 Drawing Sheets

NETWORK ELEMENT COMPRISING A SWITCH FABRIC

The invention relates to a network element which comprises a switch fabric comprising a first stage for receiving an input signal which is to be multicasted; and a second stage for, in response to the input signal, generating output signals.

Such a network element is for example an Asynchronous Transfer Mode Cell Switch or a Packet Mode Switch.

A prior art network element is known from U.S. Pat. No. 5,436,893, which discloses an Asynchronous Transfer Mode Cell Switch comprising an input stage for detecting a multicast cell and comprising a switch fabric. The switch fabric identifies the multicast cells (first stage) and makes copies thereof and routes the copies (second stage).

Generally, in case of a congested part of an output stage, a backpressure signal is sent from this part of the output stage to a corresponding part of the input stage, to cease internal transmission of the input signal from the input stage to the output stage. Such a mechanism is for example disclosed in U.S. Pat. No. 6,011,779.

The known network element is disadvantageous, inter alia, owing to the fact that in case one output signal of a multicast input signal cannot be sent out due to a corresponding part of the output stage being congested, the copying of the multicast input signal into output signals and their internal transmission are ceased. As a result, all output signals of this multicast input signal are ceased, even in case of their corresponding parts of the output stage not being congested. The known switch fabric handles output congestion in a relatively non-individual way.

It is an object of the invention, inter alia, to provide a network element as defined in the preamble which comprises a switch fabric which handles output congestion in a relatively individual way.

The network element according to the invention is characterised in that the network element further comprises a detector for detecting a parameter indicating a condition of the second stage per output signal and for generating a detection result per output signal; and a controller for, in response to the detection result, controlling the second stage per output signal.

The second stage generates output signals in response to the multicast input signal. This second stage may consist of one or more stages of physical switching elements, including a stage for transmitting the output signals. The detector detects a parameter indicating a condition of the second stage per output signal. In other words, the detector detects a parameter indicating a condition of parts of the second stage per output signal, which parts of the second stage are responsible for sending out the output signals. In response, the controller controls the second stage per output signal. In other words, the controller controls each one of the parts of the second stage individually. As a result, in case of one part of the second stage being congested, the copying of the multicast input signal into many output signals and their internal transmission no longer need to be ceased. Only one of the output signals corresponding with the congested part of the second stage cannot be delivered. All other output signals of this multicast input signal can still be delivered. The switch fabric in the network element according to the invention handles output congestion in a relatively individual way, and is therefore more efficient.

An embodiment of the network element according to the invention is characterised in that the input signal comprises a segment of a protocol data unit, the network element further comprising a further detector for detecting a further input signal comprising a further segment of the same protocol data unit and for generating a further detection result; the controller being arranged to further control the second stage in response to the further detection result.

The multicast input signal comprises a protocol data unit, such as for example a packet or a frame or a cell, or a segment thereof. The further detector detects a further input signal being a further segment of the same protocol data unit. In response, the controller can control the second stage more efficiently: For example, in case of a multicast input signal being copied into ten output signals, two out of the ten are not deliverable owing to the fact that the corresponding parts of the second stage are congested. The controller can now control the second stage in such a way that the further multicast input signal forming a segment of the same protocol data unit is only copied into eight further output signals. Two out of the ten output signals could not be delivered, therefore it is of no use to deliver the corresponding two of the ten further output signals.

An embodiment of the network element according to the invention is characterised in that the second stage comprises a generating stage and a transmitting stage, which transmitting stage comprises output buffers for buffering the output signals, and which generating stage comprises a routing stage and an accepting stage, the accepting stage comprising a branche per output buffer for supplying an accepted output signal to the output buffer, the routing stage being arranged to route the input signal in the form of the output signals to the branches.

The output buffers are of a finite size and can therefore become congested. The routing stage routes the multicast input signal in the form of the output signals to the branches, either in serial by subsequently addressing a branch, or in parallel by simultaneously addressing all relevant branches. Via the accepting stage, the output signals are accepted or not accepted in an individual way.

An embodiment of the network element according to the invention is characterised in that the controller controls the routing stage for not supplying a non-accepted output signal to the branch.

In this case, the controller prevents that a non-accepted output signal is supplied to the corresponding branch. The non-accepted output signal is generally dropped or discarded. Alternatively, it may be buffered in some intermediate buffer.

A embodiment of the network element according to the invention is characterised in that the controller controls the accepting stage for not supplying a non-accepted output signal to the output buffer.

In this case, the controller controls the accepting stage to prevent that a non-accepted output signal is supplied to the corresponding output buffer. The non-accepted output signal is generally dropped or discarded. Alternatively, it may be buffered in some intermediate buffer.

An embodiment of the network element according to the invention is characterised in that the parameter indicating the condition of the second stage per output signal is an indicator for indicating a fullness of the output buffer.

The fullness of each individual output buffer indicates this output buffer being congested or not. Of course, further calculations may be made. For example, half the output buffer must always be available for so-called guaranteed input signals. In that case, a fullness of 50% of the output buffer results in this output buffer being congested for the non-guaranteed multicast input signal.

An embodiment of the network element according to the invention characterised in that the first stage comprises a tagger for tagging the input signal, the controller being arranged to further control the second stage in dependence of a tag of the input signal.

The tag may indicate a further multicast input signal being a segment of a same protocol data unit, and/or may indicate a priority, a quality of service, a correlation (between input signals) etc.

An embodiment of the network element according to the invention is characterised in that the controller is arranged to further control the second stage in dependence of a destination of the input signal for non-routing purposes.

The destinations of the multicast input signal are related to the output buffers to be used for the corresponding output signals. In case of one destination (=one output buffer) being congested, further multicast input signals comprising the same destination no longer need to be routed to the congested output buffer, for example within a predefined time interval. This applies to so-called "single stage" switch fabrics, in which each output buffer is used for one destination. It may also apply to so-called "multi stage" switch fabrics, in which one output of a stage is used for multiple destinations, but only if the same destinations of the multicast input signal are always routed to the same output buffers.

The invention als relates to a controller for use in a network element which comprises a switch fabric comprising
  a first stage for receiving an input signal which is to be multicasted; and
  a second stage for, in response to the input signal, generating output signals.

The controller according to the invention is characterised in that the network element further comprises
  a detector for detecting a parameter indicating a condition of the second stage per output signal and for generating a detection result per output signal; and
  the controller for, in response to the detection result, controlling the second stage per output signal.

The invention yet also relates to a switch fabric comprising
  a first stage for receiving an input signal which is to be multicasted; and
  a second stage for, in response to the input signal, generating output signals.

The switch fabric according to the invention is characterised in that the switch fabric further comprises
  a detector for detecting a parameter indicating a condition of the second stage per output signal and for generating a detection result per output signal; and
  a controller for, in response to the detection result, controlling the second stage per output signal.

The invention further relates to a method for use in a network element comprising a switch fabric, which method comprises the steps of
  via a first stage, receiving an input signal which is to be multicasted; and
  via a second stage, in response to the input signal, generating output signals.

The method according to the invention is characterised in that the method further comprises the steps of
  detecting a parameter indicating a condition of the second stage per output signal and generating a detection result per output signal; and
  in response to the detection result, controlling the second stage per output signal.

The invention yet further relates to a processor program product for use in a network element comprising a switch fabric, which processor program product comprises the functions of
  via a first stage, receiving an input signal which is to be multicasted; and
  via a second stage, in response to the input signal, generating output signals.

The processor program product according to the invention is characterised in that the processor program product further comprises the functions of
  detecting a parameter indicating a condition of the second stage per output signal and generating a detection result per output signal; and
  in response to the detection result, controlling the second stage per output signal.

Embodiments of the controller according to the invention and of the switch fabric according to the invention and of the method according to the invention and of the processor program product according to the invention correspond with the embodiments of the network element according to the invention.

The invention is based upon an insight, inter alia, that multicast input signals should be handled in an individual way, and is based upon a basic idea, inter alia, that the detector and the controller are to be individualised for multicast traffic.

The invention solves the problem, inter alia, to provide a network element as defined above which comprises a switch fabric which handles output congestion in a relatively individual way, and is advantageous, inter alia, in that the network element is more efficient.

These and other aspects of the invention will be apparent from and elucidated with reference to the embodiments(s) described hereinafter.

Figure 1:
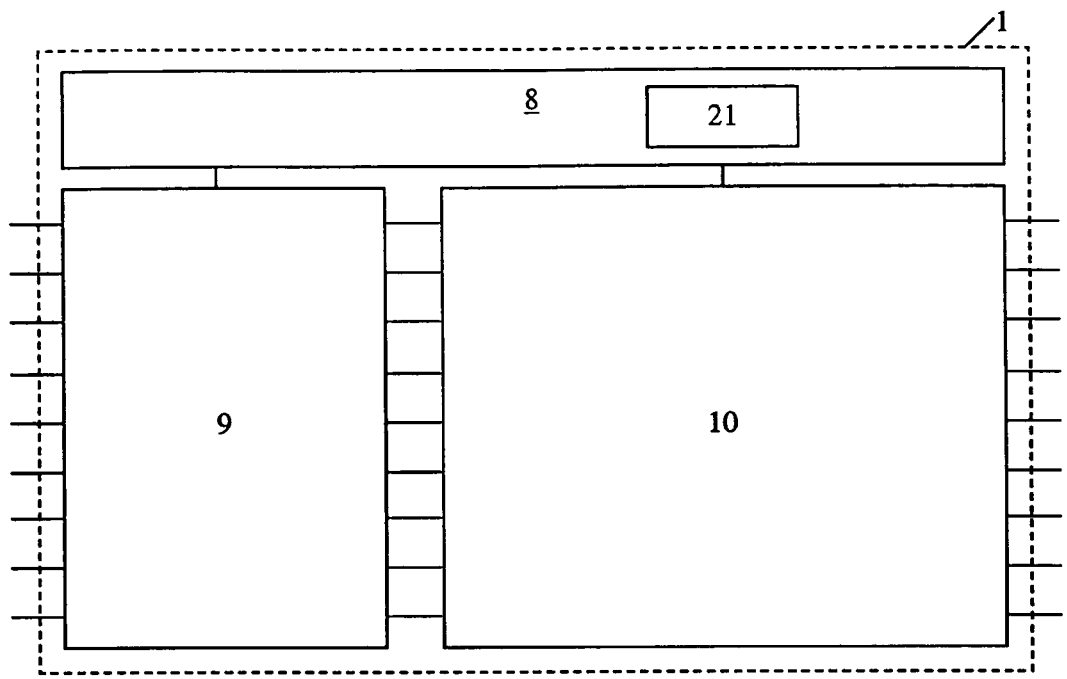
FIG. 1 shows diagrammatically a network element according to the invention comprising a controller according to the invention and a switch fabric.

The network element 1 according to the invention as shown in FIG. 1 such as for example an Asynchronous Transfer Mode Cell Switch or a Packet Mode Switch comprises a manager 8 coupled to an input buffer 9 and to a switch fabric 10. The input buffer 9 comprises many large buffers per input for receiving and buffering input signals. Its outputs are coupled to inputs of the switch fabric 10, which switches the input signals. The manager 8 comprises a controller 21 according to the invention for controlling the switch fabric. Alternatively, this controller 21 may be located between the manager 8 and the switch fabric 10, or may form part of the switch fabric 10.

Figure 2:
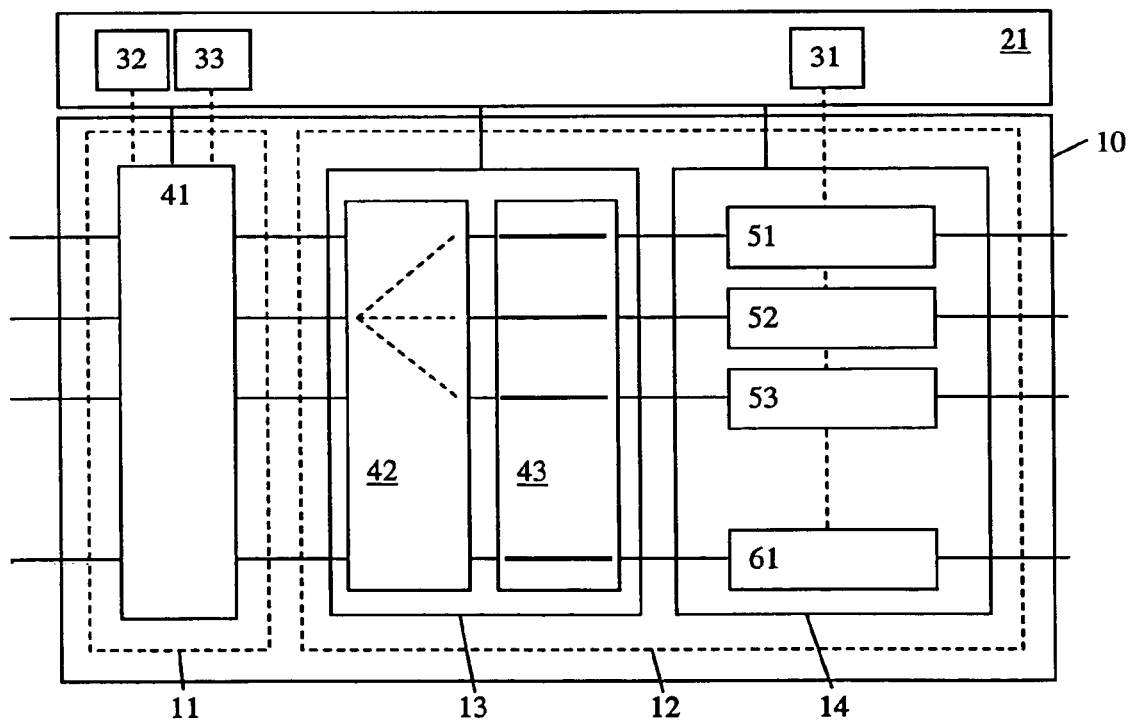
FIG. 2 shows diagrammatically a controller according to the invention and a switch fabric in greater detail.

The switch fabric 10 as-shown in greater detail in FIG. 2 comprises a first stage 11 for receiving an input signal which is to be multicasted and a second stage 12 for, in response to the input signal, generating output signals per input signal. The first stage 11 comprises a tagger 41 for tagging the input signal. The second stage 12 comprises a generating stage 13 and a transmitting stage 14. The transmitting stage 14 comprises (small) output buffers 51-61 for buffering the output signals, and the generating stage 13 comprises a routing stage 42 and an accepting stage 43. The accepting stage 43 comprising a branche per output buffer 51-61 for supplying an accepted output signal to the output buffer 51-61. The routing stage 42 is arranged to route the input signal in the form of the output signals to the branches.

The controller 21 according to the invention as shown in greater detail in FIG. 2 comprises a first detector 31 for detecting a parameter indicating a condition of the second stage 12 per output signal and for generating a detection result per output signal. In response to the detection result, the controller 21 controls the second stage 12 per output signal. The controller 21 further comprises—in case of the input signal comprising a segment of a protocol data unit—a second detector 32 for detecting a further input signal comprising a further segment of the same protocol data unit and for generating a further detection result. In response to the further detection result, the controller 21 further controls the second stage 12. This further control will be explained in view of FIG. 3.

The controller 21 further comprises a third detector 33 for detecting a tag (as provided by the tagger 41) and/or a destination of the input signal for yet further controlling the second stage in response to such a yet further detection result. This yet further control as well as the general functioning of the switch fabric 10 will also be explained in view of FIG. 3.

Figure 3:
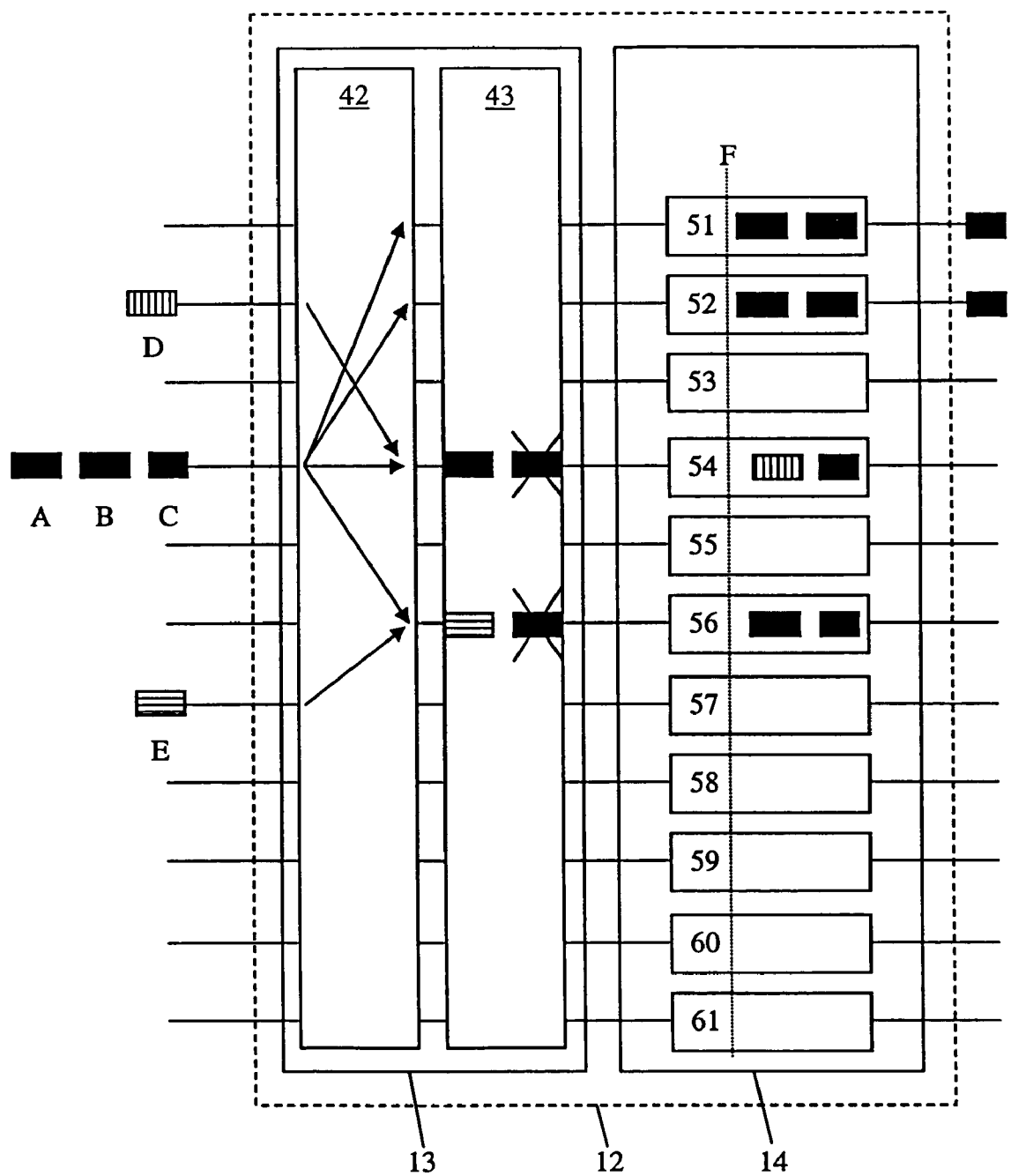
FIG. 3 shows diagrammatically an example of an input signal A-C being multicasted in accordance with the invention via a switch fabric.

An example of an input signal A-C being multicasted in accordance with the invention via the switch fabric 10 is shown in FIG. 3. The second stage 12 comprises the generating stage 13 and the transmitting stage 14. An input signal A-C which is to be multicasted to four destinations (via output buffers 51,52,54,56) comprises three protocol data units A, B and C, such as for example a packet, a frame, a cell etc. Further input signals D and E are not to be multicasted. The input signal A-C forms for example part of non-guaranteed traffic, the further input signals D and E form for example part of guaranteed traffic. The detector 31 detects a fullness of the output buffers 51-61.

Owing to the fact that the output buffers 51 and 52 are not used for further traffic, the output signals resulting from the input signal C have already passed these output buffers 51 and 52, and the output signals resulting from the input signals A and B are buffered in these output buffers 51 and 52 (the term "resulting from" here for example means "corresponding with a copy of at least a part of"). The output buffer 54 however comprises the output signal resulting from the input signal D, which output signal resulting from the input signal D has entered the output buffer 54 just after the buffering of the output signal resulting from the input signal C, and as a result, the output signal resulting from the input signal B, which is routed via the routing stage 42 and which is to be accepted via the accepting stage 43 cannot be accepted. Therefore, the output signal resulting from the input signal B is dropped or discarded. The output signal resulting from the input signal A can enter the output buffer 54, because the output signal resulting from the input signal C will have left this output buffer 54 by the time the output signal resulting from the input signal A wants to enter it.

The output buffer 56 already comprises the output signals resulting from the input signals B and C, and the output signal resulting from the input signal A is routed via the routing stage 42 and is to be accepted via the accepting stage 43. However, the output signal resulting from the input signal E has arrived and has been accepted by the accepting stage 43, and as a result, the output signal resulting from the input signal A can no longer be accepted, and it is dropped or discarded.

According to a first option, the controller 21 controls the routing stage 42 for not supplying a non-accepted output signal to the branch of the accepting stage 43. According to a second option, the controller 21 controls the accepting stage 43 for not supplying a non-accepted output signal to the output buffer 51-61. So, the controller 21 either prevents that a non-accepted output signal is supplied to the corresponding branche of the accepting stage 43, or controls the accepting stage 43 to prevent that a non-accepted output signal is supplied to the corresponding output buffer 51-61. The non-accepted output signal is generally dropped or discarded. Alternatively, it may be buffered in some intermediate buffer not shown.

In case of the input signals A-C comprising three segments A-C of one protocol data unit, the second detector 32 can advantageously be used for detecting the fact that different segments of the same protocol data unit are to be multicasted and for generating a further detection result. The controller 21 further controls the second stage 12 in response to this further detection result, for example as follows. As shown in FIG. 3, each segment A-C is for example copied into four output signals. For the output buffer 54, the output signal resulting from the segment B cannot be delivered, and for the output buffer 56, the output signal resulting from the segment C cannot be delivered. The controller 21 can now control the second stage 12 in such a way that any further segments not shown and belonging to the same protocol data unit as the segments A-C are only for example copied into two further output signals. Two out of the four output signals could not be delivered, therefore it is of no use to deliver the corresponding two of the four further output signals. This increases the efficiency of the switch fabric 10.

The parameter indicating the condition of the second stage 12 per output signal is an indicator for indicating a fullness of the output buffer 51-61. In FIG. 3, a borderline F has been drawn, to define the maximum fullness of the output buffer 51-61 for non-guaranteed traffic. Further calculations may be made. For example, sometimes half the output buffer 51-61 must always be available for so-called guaranteed input signals. In that case, a fullness of 50% of the output buffer 51-61 results in this output buffer 51-61 being congested for the non-guaranteed multicast input signal.

The third detector 33 detects a tag (as provided by the tagger 41) and/or a destination of the input signals A-C for yet further controlling the second stage 12 in response to such a yet further detection result. The third detector 33 may at least partly correspond with a prior art detector for detecting the destination of the input signal A-C for being able to perform the routing via the routing stage 42. The tag may indicate a further multicast input signal being a segment of a same protocol data unit as discussed above, and/or may indicate a priority, a quality of service, a correlation (between input signals) etc. The priority or the quality of service for example defines traffic to be guaranteed or not. The destinations of the multicast input signal A-C are related to the output buffers 51-61 to be used for the corresponding output signals. In case of one destination (=one output buffer) being congested, further multicast input signals comprising the same destination no longer need to be routed to the congested output buffer, for example within a predefined time interval. This applies to so-called "single stage" switch fabrics, in which each output buffer is used for one destination. It may also apply to so-called "multi stage" switch fabrics, in which one output of a stage is used for multiple destinations, but only if the same destinations of the multicast input signal are always routed to the same output buffers.

The switch fabric as shown in greater detail in FIG. 2 does not necessarily show an entire switch fabric. In case of the switch fabric being a so-called "multi stage" switch fabric, FIG. 2 only shows a single stage of it. In that case, in each of the subsequent routing stages, the same multicast operation has to be repeated, each time for a smaller sub-set of output ports. The stages 11,12,13,14,42,43 may then be regarded to be sub-stages.

The invention relates to handling multicast traffic in a switch fabric which performs multicast copying itself, but which has a realtively simple queuing and scheduling structure, in which case selective backpressure for multicast traffic to particular (congested) outputs is not possible. Therefore, it is important to make a distinction between a further stage where selective backpressure and the discarding of traffic from individual inputs is possible, and the switch fabric itself, which cannot do this.

The expression "for" in for example "for receiving", "for detecting", "for generating" and "for controlling" etc. does not exclude that other functions are performed as well, simultaneously or not. The expressions "X coupled to Y" and "a coupling between X and Y" and "coupling/couples X and Y" etc. do not exclude that an element Z is in between X and Y. The expressions "P comprises Q" and "P comprising Q" etc. do not exclude that an element R is comprised/included as well. The terms "a" and "an" do not exclude the possible presence of one or more pluralities.

The steps/functions of receiving, generating, detecting and controlling do not exclude further steps/functions, like for example, inter alia, the steps/functions described for FIGS. 2 and 3. An input signal A-C which is to be multicasted may also be called a multicast input signal A-C and may form a first part of a larger input signal, of which larger input signal the first part is to be multicasted (is to be copied) and of which larger input signal a second part is not to be multicasted. Further, the input signal A-C which is to be multicasted may comprise a third part which is to be multicasted and a fourth part which is not to be multicasted, etc.

The invention claimed is:

1. A controller for use in a network element which comprises:
   a switch fabric comprising:
      a first stage for receiving an input signal which is to be multicasted, and
      a second stage for, in response to the input signal, generating output signals;
   a first detector for detecting a parameter indicating a condition of the second stage per output signal and for generating a detection result per output signal; and
   a second detector which detects a destination related to an output buffer of the input signal;
   wherein the controller controls the second stage per output signal and does not route the input signals, which have the same destinations, based on the detection result and the detected destination of the input signal.

2. A switch fabric comprising:
   a first stage for receiving an input signal which is to be multicasted; and
   a second stage for, in response to the input signal, generating output signals;
   a first detector for detecting a parameter indicating a condition of the second stage per output signal and for generating a detection result per output signal;
   a second detector which detects a destination related to an output buffer of the input signal; and
   a controller which controls the second stage per output signal and does not route the input signals, which have the same destinations, based on the detection result and the detected destination of the input signal.

3. A communication method comprising:
   via a first stage of a switch fabric, receiving an input signal which is to be multicasted;
   via a second stage of the switch fabric, in response to the input signal, generating output signals;
   detecting a parameter indicating a condition of the second stage per output signal and generating a detection result per output signal;
   detecting a destination related to an output buffer of the input signal; and
   controlling the second stage per output signal so that the input signals, which have the same destinations, are not routed, based on the first detection result and the detected destination of the input signal.

4. A processor storing a program product for use in a network element comprising a switch fabric, which processor program product comprises the functions of:
   via a first stage of the switch fabric, receiving an input signal which is to be multicasted;
   via a second stage of the switch fabric, in response to the input signal, generating output signals;
   detecting a parameter indicating a condition of the second stage per output signal and generating a detection result per output signal;
   detecting a destination related to an output buffer of the input signal; and
   controlling the second stage per output signal so that the input signals, which have the same destinations, are not routed, based on the first detection result and the detected destination of the input signal.

5. A network element comprising:
   a switch fabric comprising:
      a first stage which receives an input signal which is to be multicasted, and
      a second stage which, in response to the input signal, generates output signals;
   a first detector which detects a parameter indicating a condition of the second stage per output signal and generates a first detection result per output signal;
   a second detector which detects a destination related to an output buffer of the input signal; and
   a controller, which controls the second stage per output signal and does not route the input signals, which have the same destinations, based on the first detection result and the detected destination of the input signal.

6. The network element as defined in claim 5, wherein the input signal comprises a segment of a protocol data unit, and wherein the second detector detects that a further input signal comprises a segment of the same protocol data unit and generates a second detection result;
   the controller being arranged to control the second stage based on the second detection result.

7. The network element as defined in claim 5, wherein the second stage comprises a generating stage and a transmitting stage, which transmitting stage comprises output buffers for buffering the output signals, and which generating stage comprises a routing stage and an accepting stage, the accepting stage comprising a branch per output buffer for supplying an accepted output signal to the output buffer, the routing stage being arranged to route the input signal as the output signals to the branches.

8. The network element as defined in claim 7, wherein the parameter indicating the condition of the second stage per output signal is an indicator for indicating a fullness of the output buffer.

9. The network element as defined in claim 8, wherein the controller controls the routing stage to not supply a non-accepted output signal to a branch of the accepting stage which corresponds to a full output buffer.

10. The network element as defined in claim 8, wherein the controller controls the accepting stage to not supply a non-accepted output signal to a full output buffer.

11. The network element as defined in claim 5, wherein the first stage comprises a tagger to assign a tag to the input signal, and the second detector detects the assigned tag of the input signal,
the controller being arranged to control the second stage based on the assigned tag of the input signal.

12. A network element comprising:
a switch fabric comprising:
a first stage which receives a plurality of input signals to be multicasted,
the input signals comprising segments of protocol data units,
a second stage which receives the input signals and generates corresponding output signals, the second stage comprising:
a generating stage which replicates the input signals to be multicasted as output signals, and
a transmitting stage comprising output buffers, via each of which the transmitting stage outputs a corresponding output signal, wherein the generating stage comprises a routing stage which routes the replicated input signals to corresponding output buffers of the transmitting stage, and an accepting stage comprising branches which each corresponds to the output buffer, which accepting stage accepts the replicated input signals from the routing stage and forwards the replicated input signals to the corresponding output buffers;
a first detector which detects a parameter indicating a condition of the second stage per output signal and generates a first detection result per output signal;
a second detector which determines the input signals comprising the segments of the same protocol data unit and generates a second detection result; and
a controller which controls the second stage per output signal based on the first detection result, wherein the generating stage replicates the input signals based on the second detection result.

13. The network element as defined in claim 12, wherein the generating stage replicates the input signals only for those output buffers which are not full, based on the first detection result provided by the first detector, for the input signals comprising the segments of the same protocol data unit.

14. The network element as defined in claim 12, wherein the routing stage does not send the replicated input signals to those branches of the accepting stage which correspond to full output buffers, based on the first detection result provided by the first detector.

15. The network element as defined in claim 12, wherein the accepting stage does not send the replicated input signals to full output buffers, based on the first detection result provided by the first detector.

16. The network element as defined in claim 12, further comprising:
a third detector which detects a parameter in each input signal received by the first stage, the parameter being related to at least one of a destination and an indication of the segment of a repeating protocol data unit, wherein the generating stage replicates the input signals only for those output buffers which are not full, based on the first detection result provided by the first detector, for the input signals comprising one of the same destination and segments of the same protocol data unit.

* * * * *